(12) United States Patent
LaMarca et al.

(10) Patent No.: US 6,279,013 B1
(45) Date of Patent: Aug. 21, 2001

(54) INTERACTIVE NEWSPAPER

(75) Inventors: Anthony G. LaMarca, Redwood City; David Goldberg, Palo Alto; James D. Thornton, Redwood City, all of CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/119,297

(22) Filed: Jul. 20, 1998

(51) Int. Cl.[7] ............................. G06T 7/00; G06F 17/21
(52) U.S. Cl. .................... 707/500; 382/175; 379/100.07; 709/217
(58) Field of Search ................................. 358/403, 448, 358/452; 707/511, 512, 530, 531, 540, 541, 500; 382/175, 184, 305–306; 379/100.01, 100.07, 100.11; 709/217, 218, 219

(56) References Cited

U.S. PATENT DOCUMENTS

| | | | |
|---|---|---|---|
| 5,060,980 | * 10/1991 | Johnson et al. ......................... | 283/70 |
| 5,267,303 | * 11/1993 | Johnson et al. .................. | 379/100.07 |
| 5,465,167 | * 11/1995 | Cooper et al. ..................... | 358/403 X |
| 5,515,176 | * 5/1996 | Galen et al. .......................... | 358/403 |
| 5,649,186 | 7/1997 | Ferguson ................................. | 707/10 |
| 5,666,214 | * 9/1997 | Mac Kinlay et al. ................ | 358/453 |
| 5,682,540 | * 10/1997 | Klotz, Jr. et al. .................... | 707/505 |
| 5,754,308 | * 5/1998 | Lopresti ................................. | 358/403 |
| 5,793,497 | * 9/1998 | Funk ...................................... | 358/402 |
| 5,794,235 | * 8/1998 | Chess ............................... | 707/531 X |
| 5,873,077 | * 2/1999 | Kanoh et al. .................... | 382/306 X |
| 5,943,137 | * 8/1999 | Larson et al. ......................... | 358/403 |
| 5,974,177 | * 10/1999 | Krtolica .............................. | 382/202 |
| 6,014,638 | * 1/2000 | Burge et al. ............................ | 705/27 |
| 6,052,207 | * 4/2000 | Takagi et al. ........................ | 358/452 |

* cited by examiner

*Primary Examiner*—Joseph H. Feild
(74) *Attorney, Agent, or Firm*—Fay, Sharpe, Fagan, Minnich & McKee, LLP

(57) ABSTRACT

A method and apparatus of profile guided printing of a paper document facilitates back channel interaction from a reader for contemporaneous upgrading of the profile in response to document content. The document is printed to include tokens representative of the reader and its content. While being read, the document is redacted by the subscriber in a predetermined manner representing desired changes in the document, or responses to publisher inquiries. The document can be scanned in a smart recycling bin to identify the reader and the desired changes. The reader profile is adjusted by the publisher into an upgraded reader profile upon identification of the reader redactions. Alternatively, a smart wand is used to detect the document and contents and is controlled by the user to indicate changes to the contents. The wand can store the user's and document's identification, and the desired changes and can be downloaded for updating the profile. The next document generated corresponds to the upgraded profile.

21 Claims, 4 Drawing Sheets

INTERACTIVE NEWSPAPER

BACKGROUND OF THE INVENTION

The subject invention relates to the field of document generation systems, and more particularly to a method and apparatus for interacting with a periodically issued document, like a newspaper, to revise the document content to be more customized to an individual subscriber.

The invention is particularly applicable to printed documents which include dataglyphs or tokens representative of the document and the subscriber to the document, wherein subscriber redactions to the document itself can be identified for modifying content and form of future editions. However, the subject invention is applicable to any system which provides routine generation of a document edition, either printed or electronically, and that presents an opportunity for the customized editing of a second edition by general profile guidelines for communicating information indicated by the subscriber as being particularly useful or of interest.

For purposes of pure reading, it is a fact people vastly prefer paper documents as opposed to electronic displays. However, most newspaper or news magazine type documents present an overwhelming variety and amount of information, most of which is of no interest to any one particular subscriber. For example, the top ten news stories in the paper may be of interest to most readers, but beyond these, the remaining content will have variable interest to any one reader depending upon the reader's hobbies and occupation.

Given the wealth of information available today, custom filters which adjust content to a particular user's desires are becoming increasingly useful. In electronic communication, profiles for filtering E-mail and Usenet articles are very common. On the other hand, mass media has traditionally been organized on a much coarser granularity, as by subject matter such as "sports" or "business". For the web, a number of mass media publications, e.g., newspapers and magazines, have offered on-line information services which include intelligent filtering based on user profiles. However, given the affordance of paper and the way people prefer to read print media, these online services cannot be widely used for fine-grained profile adjustments, i.e., customizing the content to individual subscribers, as long as they read on paper rather than online. The evidence remains strong that users will continue to prefer reading on paper as opposed to reading with an on-line browser. This complicates the updating of fine-grained subscriber profiles. Users need to remember what they thought of authors or topics between the time they read articles and the particular time they next use their computer.

Downloading and printing of electronic forms of newspapers from the web provides the convenience of paper for reading, but precludes filtering of content except to the extent that the reader wishes to spend the time selecting and printing portions of a single document. More importantly, this printing precludes back-channel communication to the publisher in a manner to identify a profile of preferences of the subscriber. In other words, if the subscriber wished to identify subjects having a high interest and subjects having a low interest, a publisher could print available content according to these preferences to provide a somewhat customized document. The profile thus comprises the recorded set of preferences and dislikes.

The present invention contemplates a new and improved system which overcomes the prolix disadvantages of mass media print communication to effectively combine the advantageous features of the two relevant technologies. That is, the customized newspaper which can now be read on an electronic display, is combined with the affordances and conveniences of a printed paper interface, for a resulting interactive newspaper, customized to a subscriber-identified profile.

BRIEF SUMMARY OF THE INVENTION

In accordance with the present invention, there is provided a system of profile guided printing of a paper document, including facilitating channel interaction from a reader for contemporaneous upgrading of the profile based upon a detected user response to document content. The system comprises generating an initial document content corresponding to a present reader profile. The content is printed as a paper document, together with a token or tokens. The reader redacts the paper document, typically with preselected indicia, to represent desired changes in future editions of the document. The document is scanned in a scanning device to identify the reader and the desired changes indicated by the reader's marking. The scanning system uses the token that identifies the document to look up an online copy of the document. So the system will know exactly what the document and its pages looked like. The scanner knows the location of the indicia it just scanned, and by comparing with the online copy, it knows exactly where the indicia lies relative to the articles on the page. In one embodiment, a token is physically associated with an indicia but the tokens can be placed anywhere. The present reader profile is adjusted in accordance with the scanning so that the next paper document that is printed corresponds to an upgraded reader profile. The system continually operates over time and sequential editions to continue to provide fine grained adjusting of the reader profile.

The tokens preferably comprise dataglyphs having a minimal effect on the efficient presentation and appearance of the document.

In accordance with another aspect of the present invention, an interactive newspaper is provided which includes news content and tokens representative of an identity of the newspaper and the news content therein, wherein specially marked regions are disposed for being modified by a reader and thereafter read by a scanner, essentially comprising a smart recycling bin, for selective adjustment of the news content of a subsequent edition of the newspaper. The special regions are individually associated with a particular item of news content wherein the reader modification is indicative of either deletion or addition of news content having similar subject matter in a subsequent edition. There may or may not also be a token associated with each special region.

In accordance with another aspect of the present invention, a smart wand is used to detect the document and contents and can be controlled by the user to indicate desired change to the contents. The wand can be used to scan dataglyphs or tokens, usually physically associated with each content item. Control switches on the wand can be used to indicate either deletion, lessening, or expanding of the subject matter identified by the token. Stored information in the wand can be downloaded with any of several conventional means so that the user profile can be updated and the next document would be generated in accordance with the desired changes stored in the wand.

One benefit obtained by use of the present invention is a customizable push system for a mass media document so that readers can adjust by general subject matter what content is presented in subsequent editions of the document.

Another benefit obtained from the subject invention is the provision of a document which is customized to a reader, and thereby comprises a much more efficient presentation, paper consumption and time investment to a reader in ultimately reviewing the document.

A further benefit of the subject invention is back channel communication from a class of readers to a publisher on the relative interest of a plurality of selected items in the document or a response to explicit questions for the reader, whereby the publisher can have an appreciation of reader interest in different articles and responses to specific questions.

Yet another benefit of the present invention is a convenient vehicle for the subscriber to solicit more detailed or expanded information on a subject only first generally identified by the publisher.

Other benefits and advantages for the subject new interactive document system will become apparent to those skilled in the art upon a reading and understanding of this specification.

BRIEF DESCRIPTION OF THE DRAWINGS

The invention may take physical form in certain parts and steps and arrangements of parts and steps, the preferred embodiments of which will be described in detail in this specification and illustrated in the accompanying drawings which form a part hereof and wherein.

DETAILED DESCRIPTION OF THE INVENTION

Figure 1:
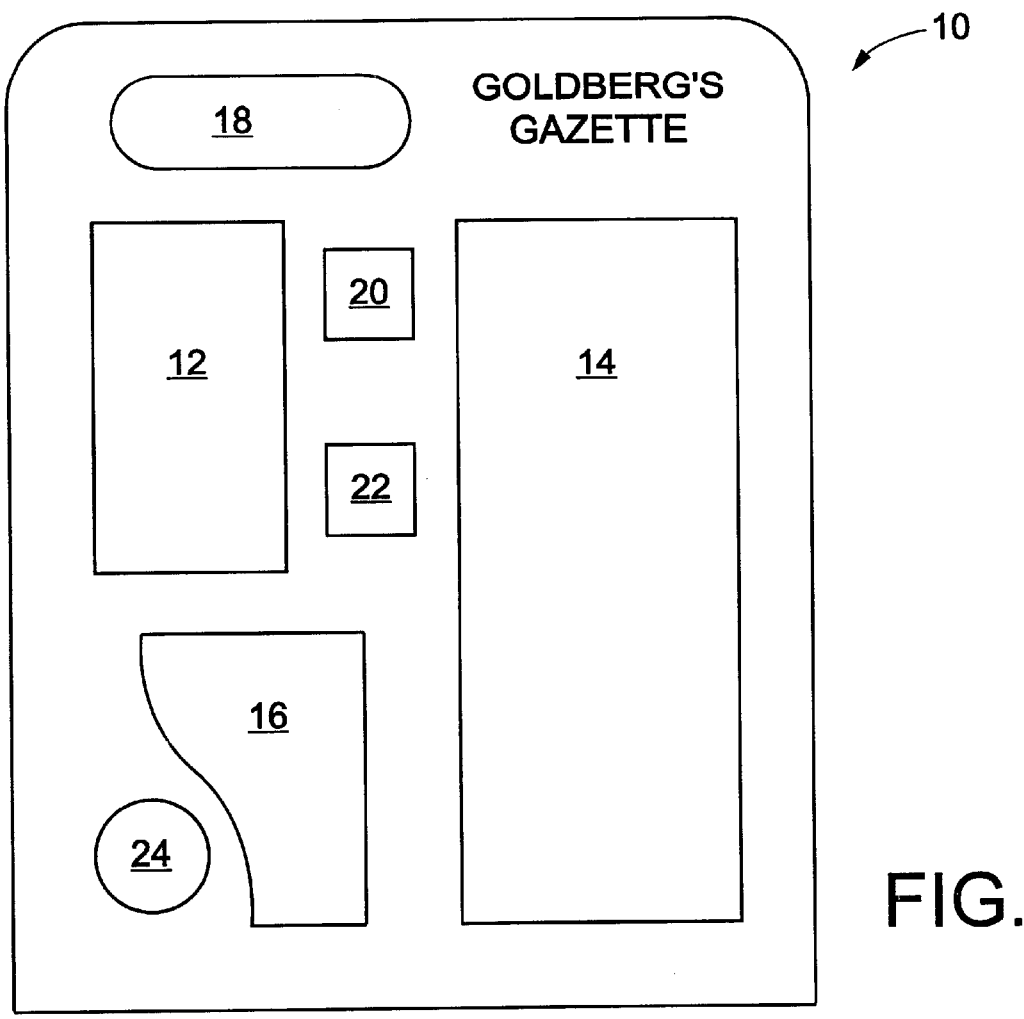
FIG. 1 is a fanciful diagram of a document including both content and tokens for identifying the document, the subscriber and the content.

Referring now to the drawings, wherein the showings are for purposes of illustrating the preferred embodiments of the invention only, and not for purposes of limiting the invention, the FIGURES show a document 10 in a format for facilitating back channel indication of a reader's preferences or dislikes concerning the document to a publisher, so that future editions can be more particularly customized for the subscriber. The invention thus provides an interactive media document which allows essentially a continuous updating of subject matter or form for a fine-grain profile of a reader/subscriber, particularly useful for print media documents.

With particular reference to FIG. 1, the document 10 is illustrated as a newspaper, including assorted content items 12, 14, 16 with associated tokens 18, 20, 22, 24. The tokens are preferably dataglyphs which allow preselected identifying data that can be encoded in a condensed form on a printed page in a reasonably aesthetic way. Although a plurality of tokens are shown, merely one token per page may be able to communicate all the necessary information. Keeping in mind that a newspaper is traditionally a one-directional media, i.e., it is read and discarded, the subject invention enables a narrow channel of return communication via the tokens. Token 18 is illustrated to comprise an identification of the subscriber of the document and the edition. Tokens 20, 22, 24 are associated with the articles 12, 14, 16, respectively. The reader can thus mark an article associated with or adjacent to the token in a manner which can be appreciated upon return to the publisher as expressing a reaction to the article. For example, token 18 would identify that the particular document was intended for an individual subscriber, and would identify the edition that the subscriber was reading. If the subscriber was particularly interested in the subject matter of the article 16, so that in a subsequent edition he would like addition or amplification of the news content of the article, the article itself or some marking box associated with this token 24 could be marked in a manner, such as a check mark, which could be read by a scanner to indicate that in the next edition of the newspaper, that subject matter should be expanded. Alternatively, if the subject matter of article 14 was a subject for which the reader has no interest, and would like to be deleted from future editions, the article or box can be marked with a different indicia, an "X", so that the publisher would appreciate to delete such subject matter in the next editions. Providing a system where a reader can directly mark on the paper they are reading facilitates a wide variety of different indicia and tokens that can be implemented to communicate between the reader and the publisher. For example, several tokens could be associated with a particular article, merely comprising an abstract, wherein a check on the "full article" box would indicate that in the next edition a full text from the abstract would be provided. Alternatively, a token box would indicate a "loved" next to a movie in the paper's review section to include a vote in a readers' opinion poll. Many other forms of comments or responses are considered to be within the scope of the type of redaction a reader could exercise while reviewing the document 10.

Figure 2:
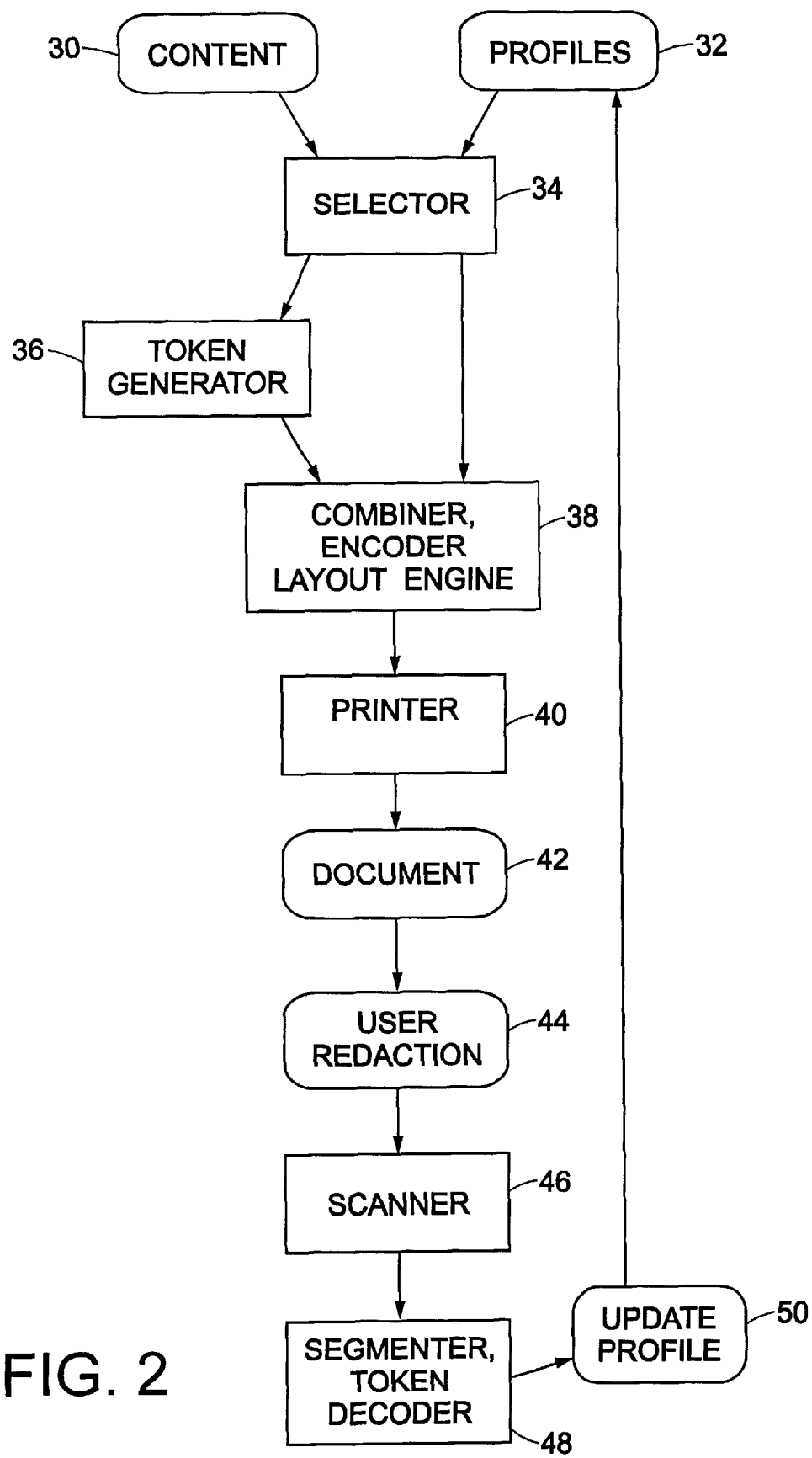
FIG. 2 is a flow-chart/block diagram detailing the distinct elements of the system and steps practiced in accordance with the present invention.

With particular reference to FIG. 2, a method for implementing the subject invention is illustrated.

The first step of generating the document is, of course, generating content for publication. The content could comprise a plurality of articles of news or features typically printed in a newspaper or magazine and stored in an article storage 30. A profile storage 32 holds a plurality of individual subscriber profiles which are indicative of article subject matter and subscriber features preferred by the individual subscriber. Both of the content storage 30 and the profile storage 32 are, of course, intended to be continually revised and updated. It should be kept in mind that the profile does not exactly specify what content is to be selected from the article storage, but rather is merely an indication of preferences and dislikes which, when compared with available content by the selector 34, essentially provides a profile guided formatting of a data stream which will ultimately comprise the document format. Specifically, the profile may merely comprise a probability or preference value which can prioritize all of the available content into a preferential order of composition as the ultimate content in the document format.

The selector 34 receives the subscriber profile and selects the subscriber features and a portion of the plurality of articles from the article storage 30 in response to the particular subscriber profile. The selector communicates a list of the articles, comprising references, features, services and programs to the token generator 36, which determines which of these items is to be associated with the token in the document format. As noted above, the tokens preferably comprise dataglyphs which necessarily identify the identity of the document, including its edition, the subscriber and the particular items with which the tokens are associated. The document content selector 34 is also directly communicated to the combiner, encoder layout engine 38, which combines the subscriber features and selected portion of the content into a document format including the embedded tokens disposed for indication of the subscriber redactions. The format will thus coincide and be printed by printer 40 in a form such as illustrated in FIG. 1. The printed document 42 is thus read and redacted at step 44.

If the reader determines that no responses are desired upon finishing the reading, the document can merely be discarded.

Alternatively, if communication is desired with the publisher then the document can be disposed into a recycling bin and provided to a scanner 46 which will recognize the dataglyphs to identify the document, the edition, the subscriber and those redactions placed on the document by the reader. The scanning information is communicated to a segmenter, token decoder 48, which determines the dataglyphs and redactions and translates them into a form which can be communicated as meaningful information to a publisher including an update of the subscriber's profile 50 for adjusting the subscriber's profile in the profile storage 32.

The method facilitates back channel interaction from the reader for contemporaneous upgrading of the reader's profile in response to a review of the document content. It is intended that the form of communication must be as easy and convenient as possible for the reader and may simply comprise pen markings on the document in preselected manners, preferably cited in the document itself.

In actual implementation, the system comprises a printing operation at a popular location, such as a commuter station, where both the printer 40 and recycling bin 46 can be conveniently located. The printing operation itself is not envisioned to take very long, since the document is intended to be customized for efficiency in terms of relative subject matter for each individual subscriber.

To this point, the invention has been referred to as a newspaper and in terms of content being produced by a mass media publication. The invention has equal merit within an organization where the publication is more of a newsletter than a newspaper. In this context, the delivery would most likely be via mail boxes and the content would be more specific to that organization. As an example, a customized newsletter may contain content such as updates from information services, internal distribution lists, or menus from the cafeteria. In this context even more personalized data might be presented. An employee who had not turned in their W2 tax form might get a reminder at the end of the newsletter and this reminder would continue to appear in future issues until the form is submitted.

From a technical standpoint, this idea does not require any complex innovations for the document itself. Very little data needs to be encoded on each page, i.e., the user I.D., the edition number, page number and some information about the geometry and resulting action of the feedback areas. This can likely be represented in a few hundred bytes, well within the capacity of dataglyph regions with an area of three or four square inches. Both the decoding of the glyphs and recognition of marks on paper have been included in existing Xerox® products and do not represent a hurdle. A printing/scanning/decoding system could be bolted onto an existing customized media application to create a workable system.

Figure 3:
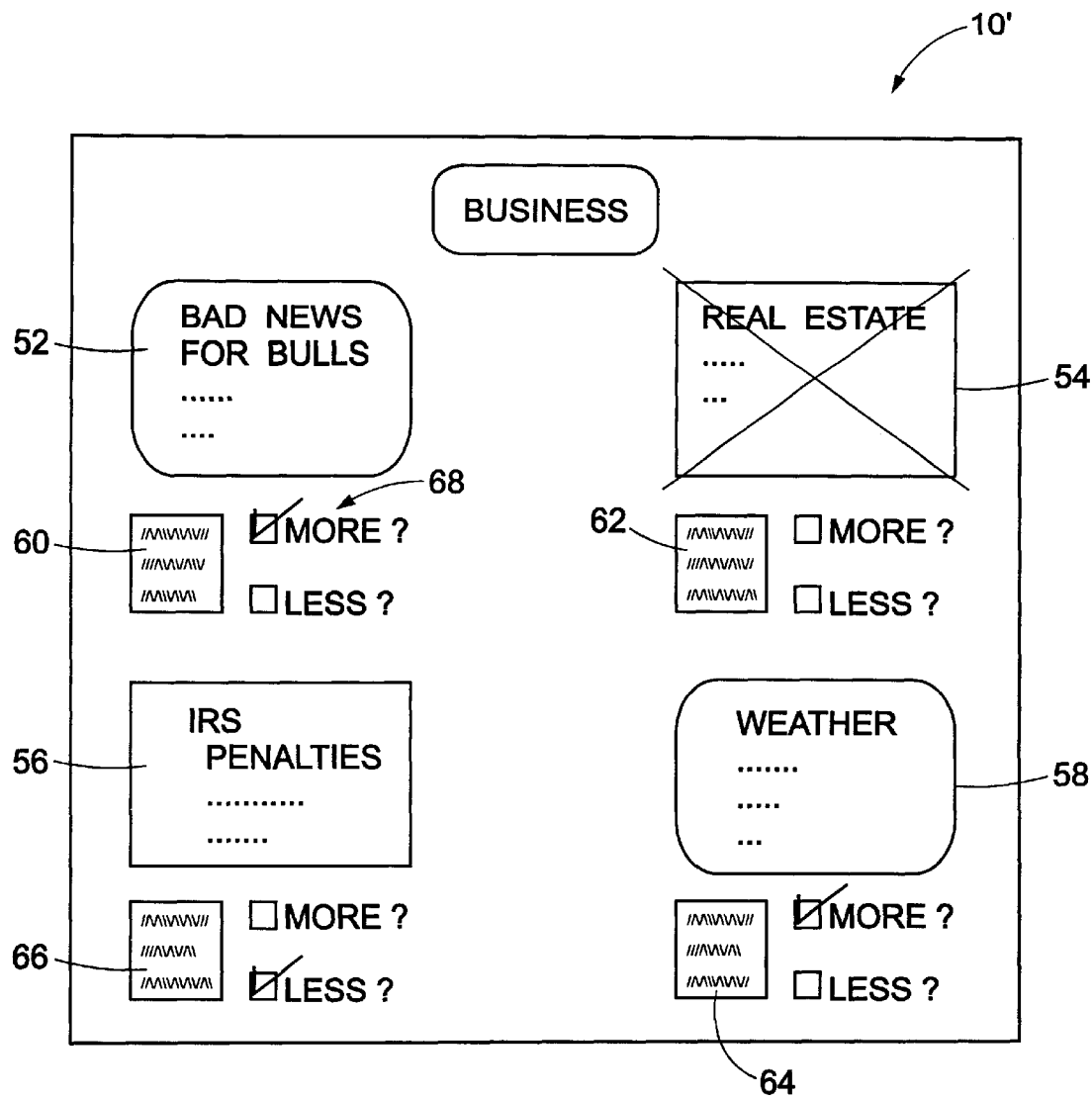
FIG. 3 comprises an alternative fanciful illustration similar to FIG. 1 including more detailed instructive portions for communicating the desired changes to the document.

With particular reference to FIG. 3 an alternative embodiment 10 of a more user instructive document is shown in which several articles 52, 54, 56, 58 are each associated with appropriate tokens 60, 62, 64, 66, respectively, but also are each provided with dedicated questionnaire boxes prompting specific responses from the user (as noted above, one token per page could accomplish the same purposes as the plurality shown). More specifically, with regard to the article 52, the user has selected the "more" box 68 with a check mark so that the subject matter of article 52 will be identified as a subject matter for this particular user's profile for which more information can be provided in the next published edition. Similarly, with regard to box 58, the user indicated that he/she wants more detailed information concerning weather reports.

With regard to document portion 56, concerning "IRS Penalties", the user indicated that "less" information is desired. Lastly, with respect to article 54 relating to real estate, the "x" through the whole article with a pen mark indicates that the entire subject matter of this document portion, e.g., real estate, can be deleted from the next edition and the user's profile will put a lowest priority on any reports for this subject matter.

Figure 5:
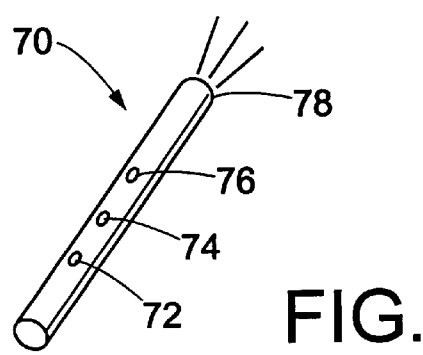
FIG. 5 is a light pen/wand that could be used in accordance with the method of the invention illustrated in FIG. 4.
Figure 4:
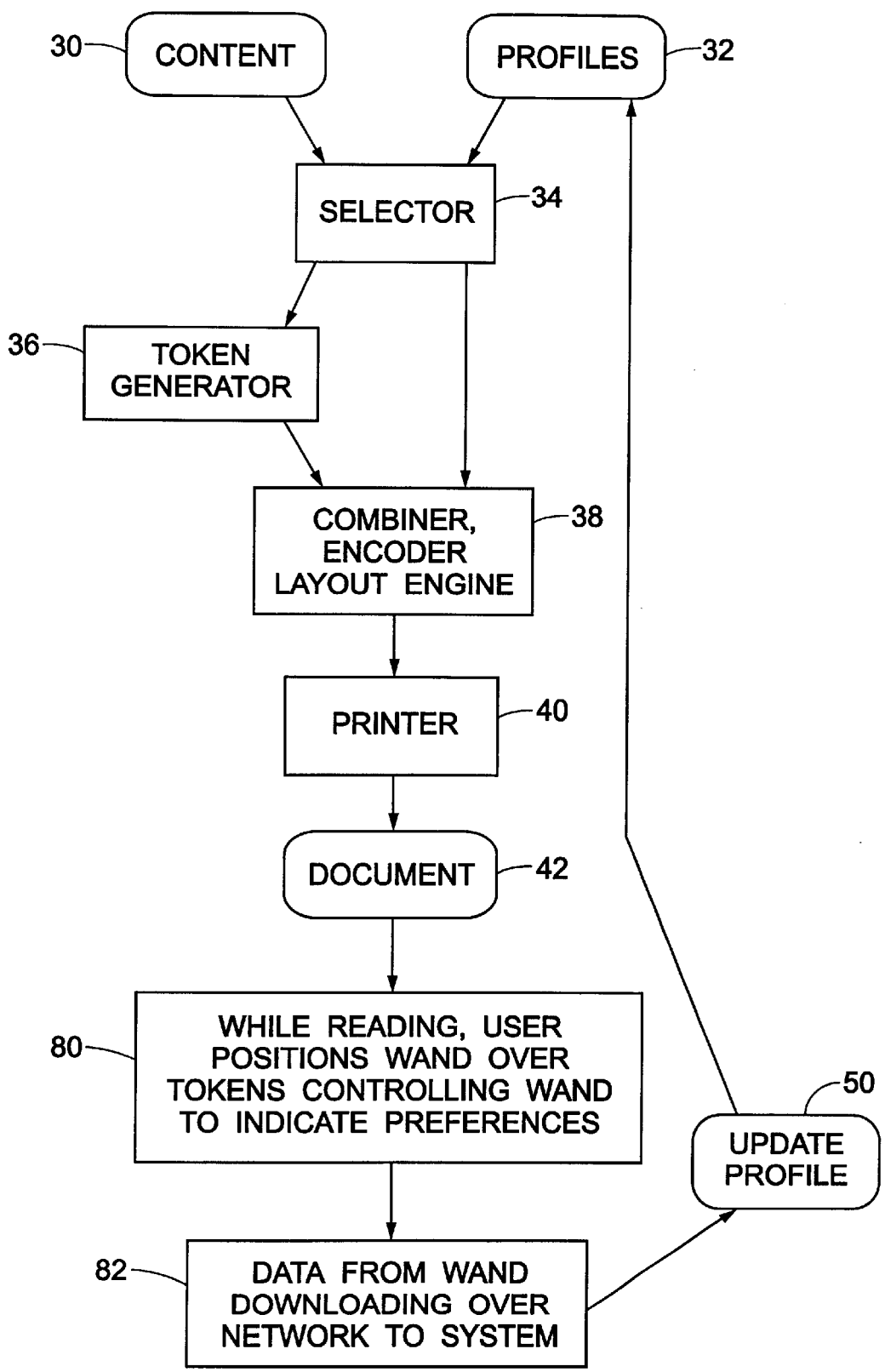
FIG. 4 is a flow-chart/block diagram of an alternative embodiment of the invention wherein a specialized wand is used in practicing the steps of scanning document tokens and user instructions for desired changes.

With particular reference to FIG. 4, another alternative embodiment is shown in which a document generation is identical to the embodiment of FIG. 2, (like numerals identify like steps) but in this embodiment rather than employing a scanner 46 for scanning the redacted document, the user employs a smart wand (FIG. 5) for identifying desired changes in the document, at the same time as when reading the document itself. More particularly, FIG. 5 shows a smart wand 70 having control switches 72, 74, 76. The wand 70 is capable of reading and storing dataglyph information 20, 22, 24 and so when reading a particular article, the switches in the wand 72, 74, 76 can be used to either indicate if the subject matter of the article should either be deleted, lessened, or expanded in the next published edition. A light 78 or other indicator (e.g., sound) will confirm the complete reading of a token by the wand. As seen in the flow-chart of FIG. 4, at step 80, the user while reading the document can position the wand over an associated token to a particular article, wait for token identification confirmation and then control the wand to indicate preferences by operating the control switches 72, 74, 76. At step 82, the data stored in the wand indicating the user's desired changes to the document can be downloaded over a network to a system. Conventional downloading schemes are known, such as an infrared reading link, or perhaps a docking system for the pen for direct link communication to a control system. After the system has received the downloaded information, the user's profile is updated, step 50, and stored as a guide in the generation of the next published document.

A feature of the embodiment of FIG. 4 is that it is not necessarily limited to easily scanned documents and can be used with any types of display since the redacted document itself is not necessary for scanning identification of the information representative of desired changes to the documents. Reading wands can simply scan many things (e.g., cereal boxes, wall posters, etc.) that are not practical to put into an ordinary scanner. Since the information is stored in the reading device 70, the particular form or subsequent use of the document becomes irrelevant to the updating of the user profile. To this end, alternative means for identifying and recording user information representative of desired changes, particularly for electronic display information, could comprise touch screens, light pens or the like for electronic displays, but it is the intention of the invention to be primarily directed to what appears to remain most users' preference for paper published formats.

The invention has been described with reference to a preferred embodiment. Obviously modifications and alterations will occur to others upon the reading and understanding of the specification. It is our intention to include all such modifications and alterations insofar as they come within the scope or the appended claims or the equivalents thereof.

Having thus described our invention, we now claim:

1. An interactive newspaper including:
   content selected and arranged according to a user profile when fixed in a tangible medium;
   tokens representative of an identity of the newspaper and the selected and arranged content;
   a reader marking associated with a particular item of the content, the marking indicative of an adjustment of the content in a subsequent newspaper; and
   a scanner which selectively scans the tangible medium newspaper and identifies tokens and reader markings on the newspaper.

2. The newspaper as defined in claim 1 wherein the reader marking comprises a first mark indicative to the scanner that the adjustment comprises a deletion of content having a similar subject matter to the particular item in a subsequent edition.

3. The newspaper as defined in claim 2 wherein the reader marking comprises a second mark indicative to the scanner that the selective adjustment comprises an addition of news content having a similar subject matter to the particular item in a subsequent edition.

4. A system for generating a newspaper customized to a profile of a subscriber in response to a subscriber redaction imprinted by a subscriber on a preexisting form of the newspaper, comprising:
   an article storage for holding newspaper content comprised of a plurality of articles and features susceptible for publication in the newspaper; a profile storage for holding a subscriber profile indicative of article subject matter and subscriber features preferred by the subscriber;
   a selector for receiving the subscriber profile and for selecting the subscriber features and a portion of the plurality of articles from the article storage in response to the subscriber profile;
   a layout engine for combining the subscriber features and selected portion into a newspaper format including a token selectively identifying the newspaper and the subscriber;
   a printer for printing the newspaper in the newspaper format;
   a scanner for receiving the newspaper and identifying the subscriber redaction; and,
   a profile processor for updating the subscriber profile held in the profile storage in response to the subscriber redaction.

5. The system as claimed in claim 4 wherein the tokens are disposed adjacent individual articles of the selected portion.

6. The system as claimed in claim 4 wherein the token comprises a glyph region.

7. The system as claimed in claim 6 wherein a first glyph region identifies the newspaper and the subscriber and a second glyph region identifies either the subscriber features or the selected portion.

8. The system as claimed in claim 4 wherein the token is associated with an area disposed for receiving a pen mark of the subscriber.

9. The system as claimed in claim 8 wherein a dedicated questionnaire box is associated with one of the articles or features.

10. A method of publishing a newspaper customized to particular interests of an individual subscriber in response to subscriber redactions marked on and read from preexisting editions of the newspaper, comprising steps of:
    generating an initial profile from the subscriber at an initial subscription to the newspaper indicating the particular interests, wherein the initial profile is stored by a publisher;
    generating content for the newspaper;
    selecting portions of the content corresponding to the subscriber initial profile;
    combining the selected portions into a newspaper format including an embedded token identifying the newspaper, the subscriber, and the selected portions;
    printing the newspaper format as a newspaper document;
    redacting the newspaper format comprising marking on the newspaper document by the subscriber for customizing subsequent editions of the newspaper;
    adjusting the initial profile into a current profile;
    scanning the redacted newspaper document to identify the current profile;
    replacing the initial profile with the current profile and storing the current profile by the publisher; and,
    publishing a next newspaper document corresponding to the current profile, whereby the subscriber may continue to redact the next newspaper document in accordance with current particular interests for continually receiving the customized newspaper.

11. The method as claimed in claim 10 wherein the redacting comprises marking the paper with indicia indicating deletion or an increase of a particular content associated with the particular token in the next newspaper document.

12. The method as claimed in claim 10 wherein the redacting comprises marking a particular content with indicia indicating deletion or an increase of the particular content in the next newspaper document.

13. The method as claimed in claim 10 wherein the scanning includes identifying subscriber indicia associated with the token, the subscriber features or the selected portion.

14. A method of profile guided printing of a paper document including facilitating a back-channel interaction from a reader for contemporaneous upgrading of the profile in response to document content, comprising steps of:
    generating an initial document content corresponding to a present reader profile wherein the content includes tokens representative of the reader and the content;
    printing the content as a paper document;
    redacting the paper document in a predetermined manner comprising reader markings of the paper document for representing desired changes in the document;

scanning the document to identify the reader and the desired changes;

adjusting the present reader profile into an upgraded reader profile based upon the desired changes; and, printing a next paper document corresponding to the upgraded reader profile whereby the next paper document can further be redacted for further upgrading of the reader profile.

15. The method as defined in claim 14 wherein the printing comprises selecting the content having a subject matter within the reader porfile.

16. The method as defined in claim 15 wherein the markings represent deletion or an increase of selected portions of document content.

17. The method as defined in claim 14 wherein the scanning comprises recognizing markings associated with the tokens.

18. A method of profile guided printing of a document including facilitating a back-channel interaction from a reader for contemporaneous upgrading of the profile in response to document content, comprising steps of:

generating an initial document content corresponding to a present reader profile wherein the content includes tokens representative of the reader and the content;

scanning the document with a reading device for identifying selected portions of the document content;

storing user instructions in the reading device in association with the selected portions of the document content for communicating desired changes to the document;

adjusting the present reader profile into an upgraded reader profile based upon the desired changes; and, generating a next document corresponding to the upgraded reader profile.

19. The method as defined in claim 18 wherein the reading device comprises a wand having control switches for indicating the desired changes, and the storing comprises operating the control switches during the scanning for indicating the desired changes.

20. The method as defined in claim 19 wherein the document includes tokens associated with distinct portions of the document content, and the scanning includes reading the tokens with the wand.

21. The method as defined in claim 20 wherein the document comprises a paper document, and the scanning comprises reading selected ones of the tokens from the document for identifying the distinct portions having the desired changes.

\* \* \* \* \*